US008601371B2

(12) United States Patent
Dirks et al.

(10) Patent No.: US 8,601,371 B2
(45) Date of Patent: Dec. 3, 2013

(54) SYSTEM AND METHOD FOR EVENT-BASED RENDERING OF VISUAL EFFECTS

(75) Inventors: Anna Dirks, Jamaica Plain, MA (US); David Reveman, Boston, MA (US); Stephen R. Carter, Spanish Fork, UT (US); Scott Isaacson, Kamuela, HI (US)

(73) Assignee: Apple Inc., Cupertino, CA (US)

( * ) Notice: Subject to any disclaimer, the term of this patent is extended or adjusted under 35 U.S.C. 154(b) by 1171 days.

(21) Appl. No.: 11/764,542

(22) Filed: Jun. 18, 2007

(65) Prior Publication Data

US 2008/0313540 A1 Dec. 18, 2008

(51) Int. Cl.
*G06F 3/00* (2006.01)
*G06F 3/048* (2013.01)

(52) U.S. Cl.
USPC ............................ 715/710; 715/778; 715/804

(58) Field of Classification Search
USPC ......... 715/810, 759, 781–783, 772, 802, 822, 715/850, 851, 859, 764, 778, 792, 821, 710, 715/80
See application file for complete search history.

(56) References Cited

U.S. PATENT DOCUMENTS

| | | | | |
|---|---|---|---|---|
| 5,534,887 A * | 7/1996 | Bates et al. | ................... | 715/802 |
| 5,771,042 A * | 6/1998 | Santos-Gomez | ............. | 715/800 |
| 5,898,432 A * | 4/1999 | Pinard | ........................... | 715/861 |
| 5,903,728 A | 5/1999 | Semenzato | ............. | 395/200.47 |
| 6,006,279 A | 12/1999 | Hayes | ........................... | 709/302 |
| 6,148,336 A | 11/2000 | Thomas et al. | ............... | 709/224 |
| 6,167,404 A | 12/2000 | Morcos et al. | ................ | 707/102 |
| 6,275,234 B1 | 8/2001 | Iwaki | ............................ | 345/428 |
| 6,317,142 B1 | 11/2001 | Decoste et al. | ............... | 345/762 |
| 6,469,723 B1 | 10/2002 | Gould et al. | .................... | 345/837 |
| 6,546,263 B1 * | 4/2003 | Petty et al. | ..................... | 455/566 |
| 6,564,201 B1 | 5/2003 | Hamsa | ............................. | 707/1 |
| 6,603,476 B1 | 8/2003 | Paolini et al. | ................. | 345/427 |
| 6,621,508 B1 * | 9/2003 | Shiraishi et al. | ............. | 715/810 |
| 6,734,873 B1 | 5/2004 | Herf et al. | ..................... | 345/629 |
| 6,742,176 B1 | 5/2004 | Million et al. | ................ | 717/120 |
| 6,782,531 B2 | 8/2004 | Young | ............................ | 717/130 |
| 6,842,856 B2 | 1/2005 | Shenassa et al. | .................. | 713/1 |
| 7,013,435 B2 * | 3/2006 | Gallo et al. | ..................... | 715/850 |
| 7,019,752 B1 | 3/2006 | Paquette et al. | .............. | 345/543 |
| 7,051,284 B2 | 5/2006 | Uemura et al. | ............... | 715/752 |
| 7,091,984 B1 | 8/2006 | Clark | ............................ | 345/587 |
| 7,254,814 B1 | 8/2007 | Cormier et al. | .............. | 718/106 |
| 7,391,422 B1 | 6/2008 | Guinan et al. | ................ | 345/581 |
| 7,559,034 B1 | 7/2009 | Paperny et al. | .............. | 715/803 |
| 7,996,787 B2 | 8/2011 | Reveman | ...................... | 715/788 |
| 2003/0079052 A1 | 4/2003 | Kushnirskiy | .................. | 709/328 |

(Continued)

OTHER PUBLICATIONS

Novell, Press Release—Novell Raises the Bar for the Linux Desktop, 2 pages, (Feb. 7, 2006).

(Continued)

*Primary Examiner* — Haoshian Shih
(74) *Attorney, Agent, or Firm* — Wong, Cabello, Lutsch, Rutherford & Brucculeri, LLP (57) ABSTRACT

A system and method is provided for rendering visual effects, or other types of effects, in response to an occurrence of one or more events. The visual effects may be rendered on a user desktop in order to alert or otherwise notify a user that the one or more events have occurred. The events may reflect incoming messages (e.g., e-mails, instant messages, etc.), application and/or system problems, downloads, appointments, alarms, updates, network status, or other software and/or hardware related events. The visual effects may be rendered on the desktop to subtly notify the user when an event of interest occurs.

29 Claims, 5 Drawing Sheets

(56) References Cited

U.S. PATENT DOCUMENTS

| | | | |
|---|---|---|---|
| 2004/0051739 A1* | 3/2004 | Schmickley et al. | 345/772 |
| 2004/0261038 A1 | 12/2004 | Ording et al. | 715/792 |
| 2004/0267940 A1 | 12/2004 | Dideriksen et al. | 709/228 |
| 2005/0027858 A1* | 2/2005 | Sloth et al. | 709/224 |
| 2005/0091254 A1* | 4/2005 | Stabb et al. | 707/102 |
| 2005/0229104 A1 | 10/2005 | Franco et al. | 715/743 |
| 2005/0246163 A1 | 11/2005 | Ono et al. | 704/200 |
| 2006/0085758 A1* | 4/2006 | Backus | 715/772 |
| 2006/0182411 A1 | 8/2006 | Loo | 386/52 |
| 2006/0248469 A1* | 11/2006 | Czerwinski et al. | 715/764 |
| 2007/0005734 A1 | 1/2007 | Abdo | 709/219 |
| 2007/0006093 A1 | 1/2007 | Day et al. | 715/781 |
| 2007/0044085 A1 | 2/2007 | Stamper et al. | 717/168 |
| 2007/0061733 A1 | 3/2007 | Schechter et al. | 715/740 |
| 2008/0057960 A1* | 3/2008 | Lahtiranta et al. | 455/435.2 |
| 2008/0189651 A1 | 8/2008 | Reveman | 715/788 |
| 2011/0261053 A1 | 10/2011 | Reveman | 345/419 |

* cited by examiner

SYSTEM AND METHOD FOR EVENT-BASED RENDERING OF VISUAL EFFECTS

FIELD OF THE INVENTION

The invention relates to enhancing usability of a user desktop using event-based rendering of visual effects.

BACKGROUND OF THE INVENTION

Various desktop display mechanisms are currently used to notify users when computing events occur in the background of a computing environment (e.g., while the user is focusing on a particular application, window, or other view). For example, events or alerts may relate to incoming messages (e.g., instant messages, e-mails, etc.), application crashes, download alerts or statuses, security issues, network connection statuses, or other hardware and/or software related events. Existing systems often use visual and/or audio alerts to notify users when such events occur, such as flashing icons, chimes, and/or popup windows. These types of alerts, however, often divert a user's focus away from a current task by bringing focus directly to the alert. Such diversions can cause abrupt and often unwelcome changes in the user's focus and attention, possibly affecting the user's current task. For example, the user may be typing a password when the focus abruptly shifts to an event, possibly leading to an incorrect password input, or an accidental display of the password, among other things.

Existing systems often use dialog boxes to alert users when events or alerts occur. For example, an event or alert may be generated by a running application, a hardware component, or other aspects of a computing environment, where functionality may block, pend, or otherwise wait for the user to sufficient action to resolve the event or alert. Thus, events or alerts often require the immediate attention of the user. When several windows are open at the same time, however, dialog boxes or other visual indicators may remain hidden under or "buried" by one or more open windows. In another example, existing systems may fail to provide adequate notification to users because audio alerts may not necessarily be heard by the user (e.g., when system volume has been set to mute, or the user has stepped away from a computer, or for other reasons). As such, existing systems fail to provide users with non-intrusive visual indicators to alert or otherwise notify the users when various events of interest occur in a computing environment.

Existing systems suffer from these and other problems.

SUMMARY OF THE INVENTION

According to various aspects of the invention, a system and method for event-based rendering of visual effects may address these and other drawbacks of existing systems. Visual effects may indicate, alert, or otherwise notify a user that an event has occurred without diverting a focus of the user from a current task, window, or other view of a desktop environment. As such, subtle yet easily perceptible visual effects may be rendered to alert or otherwise notify users when events occur, such as when the events occur in a portion of the desktop environment not presently visible to the user.

According to various aspects of the invention, an architecture including one or more visual effects plug-ins may be used to render visual effects based on one or more events. For example, visual effects may be rendered in a portion of a desktop environment to indicate that an event has occurred in another portion of the desktop environment, the same portion of the desktop environment, or otherwise (e.g., a portion of the desktop may glow, ripple, display an animated image, or display other visually perceptible effects). The architecture may be configured to associate one or more of the visual effects with one or more events that can occur in a desktop environment. For example, an associated visual effect may be rendered in a portion of a desktop environment visible to a user when an event occurs anywhere in the desktop environment, and the user may access the event by interacting with the rendered visual effect.

According to various aspects of the invention, the desktop environment may be configured as a virtual environment including a collection of workspaces (e.g., a Virtual Display Configuration (VDC)). For example, the virtual environment can include the one or more workspaces arranged as a grid, a matrix, a cube, or other configurations, and each block within the grid, matrix, or cube may represent a separate workspace. Further, the virtual environment may be used in a configuration where various workspaces may not necessarily always be visible to a user (e.g., an active workspace may be displayed, while other workspaces remain accessible within the environment). As such, under existing systems, an event may occur in a portion the environment not presently visible to a user, and the event may be overlooked because the user is viewing a different portion of the environment. By contrast, in various implementations of the invention, one or more visual effects may be rendered in the portion of the environment being viewed by the user, such that the user can be alerted or otherwise notified when an event occurs, and can further be alerted as to a location of the event.

According to various aspects of the invention, visual effects may be rendered to notify or alert a user that an event has occurred in a portion of a desktop environment being viewed by the user (e.g., an active workspace), or a portion of a desktop environment not being viewed by the user (e.g., one or more inactive workspaces), or otherwise without limitation. For example, visual effects may be rendered across multiple workspaces within a grid of workspaces in a virtual environment. It will be apparent, however, that the virtual environment may be arranged in various ways (e.g., as a cube, a matrix, or other arrangement). Various portions of the virtual environment may be visible to the user at any given moment, including a single workspace, multiple workspaces, a subset of a workspace, portions of various workspaces, or various combinations thereof. As such, the visual effects may be rendered to alert a user that an event has occurred, as well as to identify or otherwise indicate a directional or spatial location of where the event occurred within the environment. For example, to notify a user of an event relating to receipt of a new e-mail message, a visual effect may be rendered in a visible portion of the environment, and a user may be directed to the event by interacting with the rendered visual effect (e.g., a user may mouse-over the effect, and the new e-mail message may be displayed). In another example, a visual effect (e.g., a ripple effect) may indicate a location (e.g., a folder) where a file (e.g., a completed download) has been saved (e.g., a ripple effect may emanate from the folder to indicate the location of the downloaded file). The effect may be configured to continue for a predetermined time, or until a predetermined condition has been satisfied. As such, the user may be visually notified of where the downloaded file has been saved, rather than requiring the user to search for the file independently. Many other examples will be apparent.

Other objects and advantages of the invention will be apparent to those skilled in the art based on the following drawings and detailed description.

DETAILED DESCRIPTION

According to various aspects of the invention, a system and method for event-based rendering of visual effects or other types of effects on a user desktop may provide a user with an alert or other suitable notification that one or more events have occurred. For example, events may relate to incoming messages (e.g., e-mail messages, instant messages, or other messages), application and/or system problems (e.g., an application crash, or a hardware failure, etc.), downloads, appointments, alarms, updates, network connection status, or any other software or hardware related events.

The invention may be implemented in any suitable computing environment that includes a display (e.g., a monitor, an LCD screen, etc.) for representing a desktop environment. When an event occurs, one or more visual effects or other types of effects may be rendered on the display within a visible area of the desktop environment to subtly notify the user of the event occurrence. Suitable computing environments may vary, without limitation, and may include personal computers, personal digital assistants, web-enabled mobile phones, WAP devices, web-to-voice devices, handheld computers, cell phones, laptops, digital music players, or various other computing devices having a display mechanism.

Figure 1:
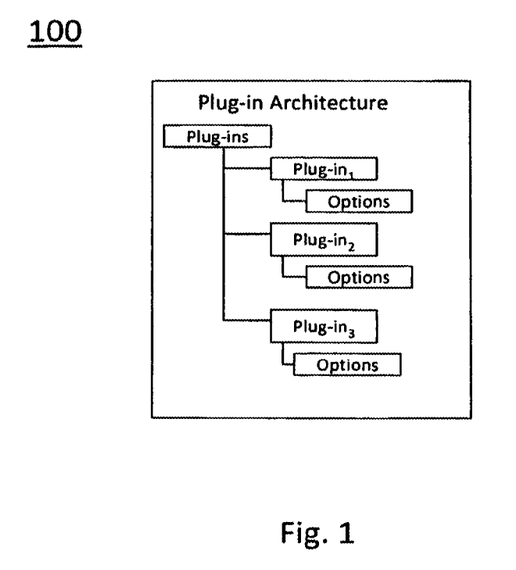
FIG. 1 illustrates an exemplary plug-in architecture for event-based rendering of visual effects according to various aspects of the invention.

Referring to FIG. 1, an exemplary plug-in architecture 100 for event-based rendering of visual effects is illustrated according to various aspects of the invention. Plug-in architecture 100 may be used to manage a plurality of visual effect plug-ins in a computing environment. Plug-in architecture 100, as shown in FIG. 1, may enable one or more plug-ins to be exchanged, modified, removed, or added within architecture 100, among other things. For example, FIG. 1 illustrates an exemplary plug-in architecture 100 including one or more effect plug-ins (e.g., plug-in$_1$, plug-in$_2$, plug-in$_3$, etc.).

Plug-in architecture 100 may be any suitable software component within a computer system or environment that provides a modular architecture for implementing a plurality of effect plug-ins (e.g., visual effect plug-ins). For example, in various implementations, the plug-in architecture may be modeled after the architecture described in related co-pending U.S. patent application Ser. No. 11/702,646, entitled "Plug-in Architecture for Window Management and Desktop Compositing Effects," filed Feb. 6, 2007, which is hereby incorporated by reference in its entirety.

The plurality of plug-ins may share graphics hardware resources (e.g., a graphics card, processor, display device, etc.) in order to render visual effects in response to event occurrences. Each of the plug-ins may further include configuration options for customizing or otherwise associating the visual effect plug-ins with one or more software and/or hardware related events (e.g., a given visual effect plug-in may be invoked when an associated event occurs). As will be apparent, the plug-ins may be customized using any suitable configuration interface. The plug-ins may be further customized to render various visual effects, including glow, sparkle, ripple, rain, transparency, shadow, darken, frost, de-saturate, animated images, and/or color changes. Other effects (e.g., non-visual effects, such as audible effects) may be used, however, as will be apparent.

Figure 2A:
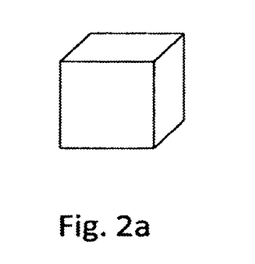
FIG. 2a illustrates an exemplary. "cube" representation of an exemplary desktop environment according to various aspects of the invention.

In various implementations, the invention may be used in a desktop environment that includes multiple workspaces. For example, referring to FIG. 2a, an exemplary "cube" representation of an exemplary desktop environment is illustrated according to various aspects of the invention, where each face of the cube may represent a different workspace within a desktop environment. The cube representation may be generated or rendered in the desktop environment using an effect plug-in, such as a cube effect plug-in implemented using XGL (i.e., an X server architecture layered on top of OpenGL, which may be designed to take advantage of modern graphics cards or other available accelerated three-dimensional rendering hardware). The visual cube representation of the desktop environment may provide a user with a way to create multiple workspaces that have adjacency, and may use a metaphor of a rotating cube to allow the user to navigate the workspaces. By observing a direction in which the cube spins or otherwise rotates, the user can maintain a spatial context of the various workspaces by viewing boundaries between cube sides.

Figure 2B:
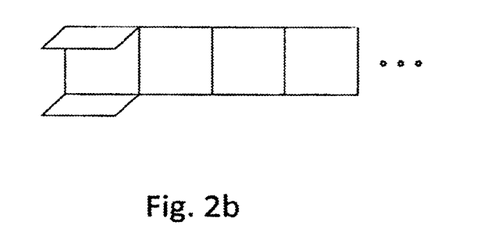
FIG. 2b illustrates an exemplary "unwrapped" representation of the cube desktop environment shown in FIG. 2a according to various aspects of the invention.

For example, referring to FIG. 2b, the cube representation of the desktop environment is illustrated in an "unwrapped" configuration. Although FIG. 2b illustrates an unwrapped representation a cube having six faces, it will be apparent that a desktop environment may include any number of faces in order to display a plurality of workspaces (e.g., the number of cube faces, or "sides," may be infinite). Further, in various implementations, the number of faces may be limited, or the cube may be configured in a non-unwrapped (i.e., "wrapped") representation, or otherwise, as will be apparent.

Figure 3:
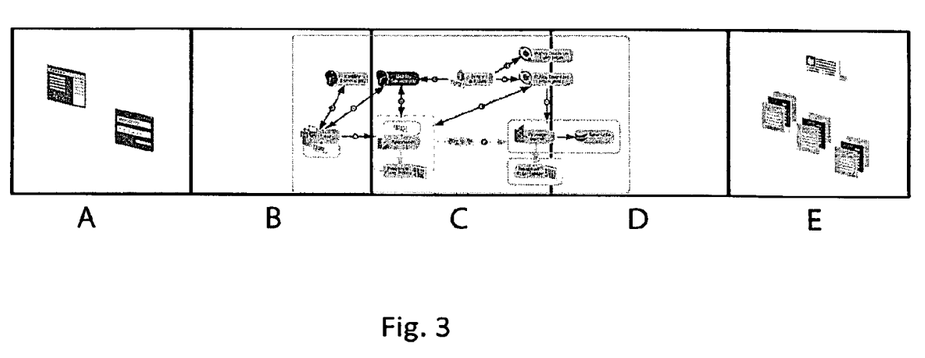
FIG. 3 illustrates an exemplary desktop environment including a plurality of workspaces according to various aspects of the invention.

Referring to FIG. 3, an exemplary desktop environment including a plurality of workspaces is illustrated according to various aspects of the invention. As shown in FIG. 3, the unwrapped cube desktop environment may include multiple workspaces (i.e., workspaces A-E), where the workspaces do not necessarily limit objects being displayed in the various workspaces. For example, as shown in FIG. 3, a user may be working on a diagram spanning more than one workspace (i.e., the diagram spans workspaces B-D), while the user may also be working on two tasks running in workspace A, as well as various additional tasks running in workspace E. Further, a user may be zoomed in on the desktop environment, such that a view area in use actually spans less space than a single workspace.

Thus, while a desktop environment may include various workspaces, a user may configure a display or a view area to show various portions of the environment at any given time, including a single workspace, multiple workspaces, portions of a single workspace or multiple workspaces, or various combinations thereof, as will be apparent. As such, the invention may not be limited to arranging multiple workspaces into a cube format; in various implementations, multiple workspaces may be joined together in a grid-like format (e.g., to be displayed as a video wall using multiple video monitors). For example, referring to FIG. 4, an exemplary virtual desktop environment 200 (e.g., a Virtual Display Configuration) (VDC)) may include a collection of fifteen workspaces (e.g., five columns, represented as A-E, and three rows, represented as 1-3). Further, networked environments, grid environments, or virtual machine environments, among various others, may be used to handle events among a diverse and disparate group of tasks, processes, devices, or displays, among other configurations. For example, a portion of a virtual display may be dedicated to a specific virtual machine, grid selection, or other aspect of any suitable desktop environment.

Figure 4:
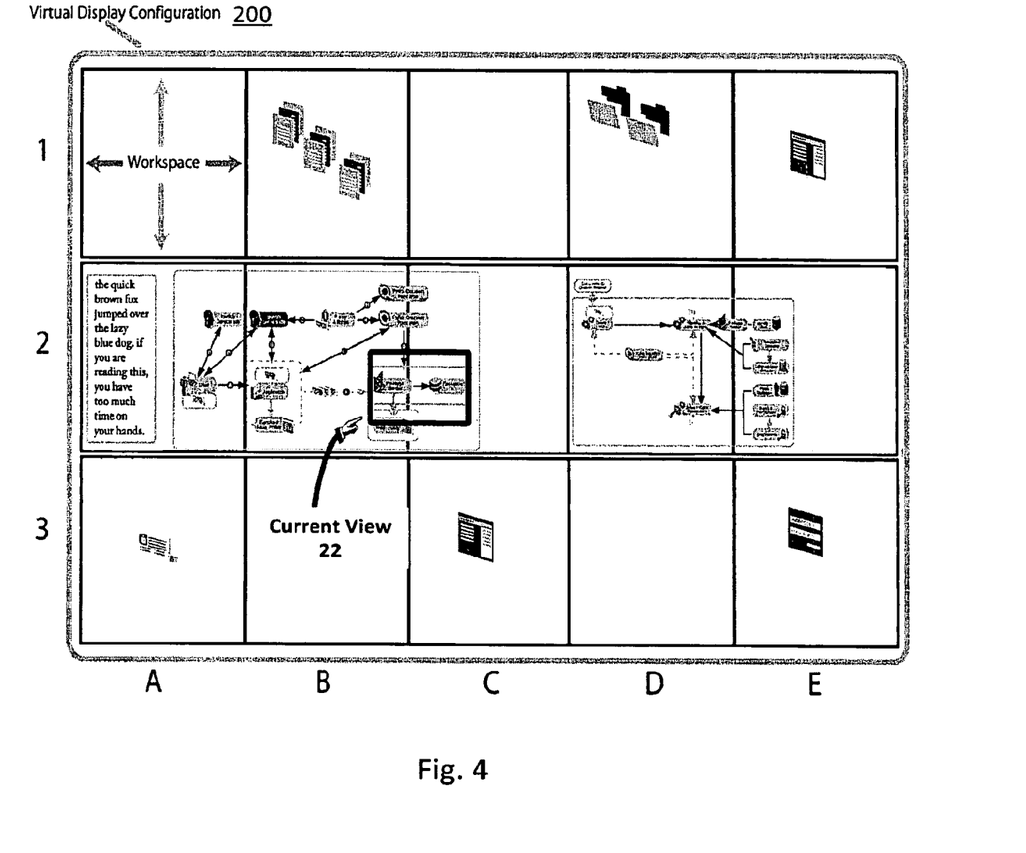
FIG. 4 illustrates an exemplary Virtual Display Configuration (VDC) according to various aspects of the invention.

As such, a user may arrange virtual environment 200 in any suitable way that the user prefers to organize work. For instance, many existing systems support "dual head" video cards that permit two video displays to be joined together and used as a single display. Further, many physical display devices can be configured to be a single viewing device, and may be used by the user to organize work. It will be apparent, however, that workspaces in virtual desktop environment 200 may be arranged or otherwise configured in many different ways, including linear workspace configurations (e.g., spinning cube), multidimensional (e.g., a matrix or two-dimensional array), regular, irregular, or disjoint, among other configurations.

Virtual desktop environment 200 may further be configured or arranged to have certain applications, or groups of applications, appear in predetermined workspaces. For example, as shown in FIG. 4, a user may configure or otherwise customize virtual desktop environment 200 in any suitable way to arrange tasks, work, applications, or other aspects of a desktop environment. The user may arrange virtual desktop environment 200 to have a file browser or explorer open in workspace 1-D, an e-mail application open in workspace 3-C, and one or more instant messages applications open in workspace 3-E, among others.

The user may configure virtual desktop, environment 200 to persistently arrange tasks, applications, windows, or other objects within predetermined workspaces (e.g., workspace 3-C may be configured to always automatically load an e-mail application). Moreover, in various implementations, a user may create a collection of workspaces, or otherwise dedicate a collection of workspaces, to an application spanning multiple work spaces. For example, the user may be working on a large diagram that spans multiple workspaces, such as the diagrams illustrated in workspaces 2-A through 2-E in FIG. 4. Further, the user may zoom into a particular location within virtual desktop environment 200, such as a portion of a single workspace, or portions of multiple workspaces, without limitation. For example, as shown in FIG. 4, a user may zoom in on an area referred to as current view 22. Thus, it will be apparent that a visible portion of virtual desktop environment 200 may vary in many different instances, such as in FIG. 4, where a current view 22 remains smaller than a single workspace but spans multiple workspaces (e.g., by zooming out, the user may view areas larger than one workspace, such as a simultaneous view of workspaces 2-A, 2-B, 3-A, and 3-B within the virtual environment of fifteen workspaces). In examples where a user zooms in on a desktop environment, rendering visual effects to indicate an event occurrence may be particularly useful, as a virtual space may become much larger, which may have the further effect of narrowing the user's focus.

In another example, different display devices may each provide a view into disjoint sections of virtual desktop environment 200. For example, a user may have three display devices, where workspace 3-C may be displayed on a first device, workspace 1-A may be displayed on a second device, and workspace 1-E may be displayed on a third device. As will be apparent, however, the environment may be viewed using various suitable configurations, without limitation, and without departing from the scope and spirit of the invention.

In a desktop environment where a user tends to focus on a current task, application, window, workspace, or other object in the environment, events may occur outside of the user's area of focus (e.g., as shown in FIG. 4, a new e-mail event may occur in workspace 3-C, while the user's current focus is directed at current view 22). In these and other instances, the invention may provide a mechanism for generating a subtle yet visually noticeable visual effect to notify or otherwise alert the user that such an event has occurred. The visual effect may be rendered using plug-in architecture 100 described in FIG. 1, and may direct a user's attention towards the event. Each of the effects may be customized (e.g., according to a user preference, or otherwise), or default settings may be used. As such, various visual effect plug-ins may be configured or otherwise associated with an occurrence of one or more events.

Figure 5:
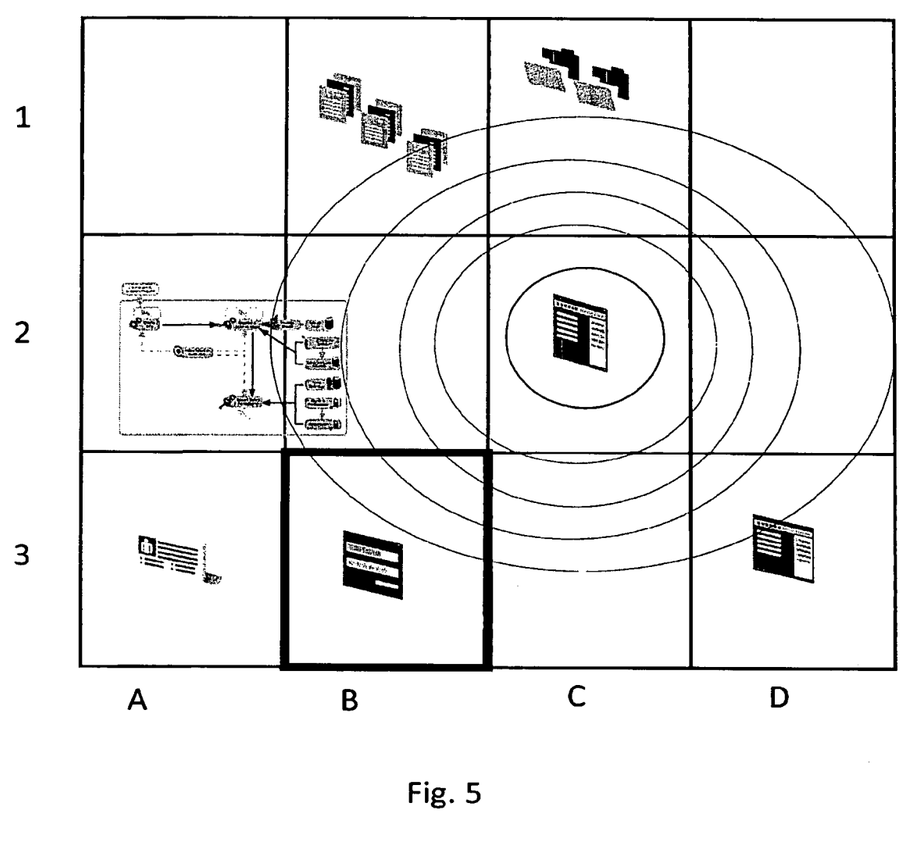
FIG. 5 illustrates an exemplary representation of a ripple visual effect plug-in according to various aspects of the invention.

In various implementations, a mechanism may be provided whereby any task, application, or other object may request attention from a user without changing a current focus of the user, without generating a flashing icon, or otherwise actually diverting the user's attention would be common in existing systems. For example, an event-based rendering of a visual effect according to various aspects of the invention may provide a subtle but noticeable visual cue that directs the user's attention to an event that has occurred. For example, as shown in FIG. 5, a user may be working within a current workspace (e.g., bolded workspace 3-B) of the virtual desktop environment depicted therein, and a high priority email message may arrive (e.g., based on sender, subject, and/or other criteria) in another workspace (e.g., where the e-mail application may be arranged in workspace 2-C). As such, FIG. 5 illustrates an exemplary visual effect (i.e., a simple ripple effect, or ocean wave pattern) emanating from the email application in workspace 2-C, where the visual effect may move gently toward a location where the e-mail event can be handled. As such, the user to follow the effect, or may interact with the effect, in order to handle the event. Further, in various implementations, the visual effect may provide additional information, in addition to a notification of an event (e.g., priority information associated with the event).

For example, the visual effect may be configured to vary a size of a ripple or ocean wave effect to indicate the priority or urgency an associated event. In another example, a visual effect may include an animated image, such as a surfer on a surfboard, where a color of the surfboard or a color of the surfer's trunks may be varied to indicate priority. Various other animations may be used, without limitation, including flying birds, galloping horses, boats, planes, or hang gliders, among many others. In yet another example, a rain storm visual effect may be used to indicate a general direction of an event relative to a user's current view (e.g., in response to an event, a rain storm may begin in a corner of the current view to indicate a general direction where the event can be handled, and a severity of the storm may further vary to indicate a priority of the event). In still another example, a visual effect may be used to indicate the location of a newly downloaded file. For example, the effect may emanate from a location of the newly downloaded file (e.g., (e.g., a file or folder), enabling the user to immediately know a location of the downloaded file, rather than having the user independently search for the file. It will be apparent, however, that various other visual effects may be used, without limitation, where the visual effect will not force a user to focus on an event, or otherwise intrude into a current activity of the user. Rather, the visual effect may simply indicate to the user that the event has occurred by causing a visual cue to be rendered within a current desktop environment view.

In various implementations, the invention may further provide a feature for a user to interact with a visual effect to handle an event. For example, when a visual effect has been rendered in a current view to indicate an event occurrence, a user may mouse-over a visual effect (i.e., by hovering a mouse cursor over an object without clicking). In response to the mouse-over, the current view may be automatically shifted to a workspace where the event can be handled. The user may subsequently elect to view the event without handling it (e.g., the user may view the event, and may then return to the previous view by mousing-off the visual effect). Alternatively, the user may handle the event (e.g., by clicking the mouse on the event or the effect, or by pressing a predetermined key), in which case the view of the event may become the user's current view. In various implementations, when a user interacts with a visual effect, a perceptible confirmation effect may be rendered to notify the user that the interaction was effective. The confirmation may be rendered to prevent users from incorrectly or inadvertently believing that the interaction was not processed due to lack of an immediately perceptible system response. For instance, when a user interacts with a ripple visual effect to handle an event, the visual confirmation may include the ripple effect visually "bursting" or otherwise acting in a more visually intense manner so as to notify the user that the interaction has been recognized. In another example, an auditory confirmation may be provided, such as a bell, chime, or other suitable sound, or auditory and visual confirmations may be used in combination, or other variations may be used, without limitation, as will be apparent.

In various implementations, when the user switches views to handle the event, a new visual effect may be rendered to indicate that a previous view has been interrupted by the current event view. As such, by mousing-over the new visual effect, a user's view may be shifted back to the previous view where the user may elect to continue with that task (e.g., by clicking the mouse). Or, in similar fashion as described above, the user may return to the event view by mousing-off the new visual effect. It will be apparent that various modifications and combinations of visual effects may be used within the scope of the invention such as using multiple visual effects to indicate multiple unhandled events, previous views, or various combinations thereof. For example, when a plurality of events occur causing a plurality of visual effects or indicators to be rendered, visual indicators may be arranged in a stack, a queue, alongside one another, or in other configurations to provide navigation among events, tasks, or other spaces. For instance, a plurality of visual effects may be rendered to provide indicators for a plurality of events. The plurality of events may occur at substantially the same time, or in succession, or otherwise, as will be apparent. Thus, as a user interacts with the rendered visual effects, a stack, queue, trail, or other configuration of visual effects may be rendered to lead the user back to an original task in an order in which the events corresponding to the effects were handled. In another example, visual effects may be rendered in a distinct spatial organization to allow the user to return to any previous task or event of that the user chooses. In still another example, visual effects may be rendered to enable the user to navigate between or among events in various ways, without limitation, as the user deems necessary to handle events or return to previous tasks or events. Many other variations will be apparent.

For example, in various implementations, multiple visual effects may be used to provide an indication relating to a single event (e.g., a first visual effect, such as a ripple, may provide a subtle indication, while a second visual effect, such as an animated surfer, may provide a severity indication). For instance, the first effect (i.e., the ripple) may direct attention to a side of a viewing area, where the second visual effect (i.e., the animated surfer) may be waiting to catch a wave (i.e., a mouse-over) to the event. Further, a color of the surfer's swimming attire or surfboard may be varied to indicate a severity of the event, while a direction that the surfer is trying to go may indicate an exact location of the event in a virtual desktop environment. Further, visual effects may cascade as events occur, as one event is handled before another is finished, or otherwise. As such, the visual effects may be marked to indicate an order in which they occur, or an order in which previous views were interrupted, or otherwise (e.g., where the markings may be varied according to color, numbering, luminescence, or other criteria). As such, various effects may be collected within a view as events are handled, await selection, await dismissal, or otherwise, as will be apparent.

According to another example, a visual effect may be rendered in response to an event even when the event may be visually displayed. For example, the event may occur in a workspace being displayed by a physical display device, yet the event may be visually unavailable for various reasons (e.g., the event may be buried under other windows or applications, or displayed on a device not presently being viewed by the user, or otherwise). Thus, the invention can attract a user's attention to an event, even when the event is actually displayed.

For example, an event may be associated with a modal window. A modal window, as commonly known, can be a child window that has to be closed before a user can return to operating a parent application. Modal windows may be commonly used in graphical user interfaces to absorb user awareness, or to display emergency states, among other things. Modal windows, however, commonly get "buried" under other application windows, such that rendering of a visual effect may be used to attract attention to the modal window. For example, a current view may darken, or other effects may be used, to indicate an event in the modal window. Various other effects may be used (e.g., cursor effects). In another example, a visual effect may be associated with an application crash event (e.g., a color of an application window may desaturate for a predetermined amount of time to indicate that a non-responsive application). It will be apparent that any suitable visual effects may be used, without limitation, where the visual effect associated with any given event may be selected based on which effect may be best suited for providing helpful information in a given context (e.g., a shadow effect may create a shadow under a non-responsive window).

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for event-based rendering of visual effects, comprising:
    displaying, on one or more display devices, one or more workspaces associated with a desktop environment, wherein the desktop environment further includes one or more additional workspaces that are neither displayed nor located on the one or more display devices;
    detecting at least one event in the one or more additional workspaces associated with the desktop environment that are neither displayed nor located on the one or more display devices; and
    rendering at least one visual effect to visually indicate that the detected event occurred in the one or more additional workspaces associated with the desktop environment that are neither displayed nor located on the one or more display devices.

2. The method of claim 1, wherein the rendered visual effect directionally or spatially identifies a location in the one or more additional workspaces in which the detected event occurred relative to the one or more workspaces associated with the desktop environment displayed on the one or more display devices.

3. The method of claim 1, wherein the desktop environment organizes the one or more workspaces displayed on the one or more display devices and the one or more additional workspaces in a multi-dimensional spatial context.

4. The method of claim 1, further comprising navigating to the detected event in response to receiving an interaction with the rendered visual effect.

5. The method of claim 4, further comprising generating a visually perceptible confirmation effect or an audibly perceptible confirmation effect in response to receiving the interaction with the rendered visual effect.

6. The method of claim 4, further comprising rendering a return visual effect to visually identify the one or more workspaces associated with the desktop environment that were displayed on the one or more display devices prior to navigating to the detected event.

7. The method of claim 1, further comprising:
    navigating to the detected event in response to receiving a mouse-over interaction with the rendered visual effect; and
    navigating back to the one or more workspaces associated with the desktop environment that were displayed on the one or more display devices prior to navigating to the detected event in response to a mouse-off the rendered visual effect.

8. The method of claim 1, wherein the at least one event includes a plurality of events and the at least one visual effect includes a plurality of visual effects rendered in a configuration that enables a user of the desktop environment to navigate among the plurality of events.

9. The method of claim 8, wherein the rendered configuration further identifies relative severities of the plurality of the events and relative orders in which the plurality of events occurred.

10. The method of claim 1, further comprising rendering a second visual effect to indicate a severity of the detected event.

11. The method of claim 1, further comprising storing one or more visual effects plug-ins in a data repository, wherein the one or more visual effects plug-ins associate the at least one visual effect with a type associated with the detected event.

12. The method of claim 1, wherein the detected event relates to an incoming message, a software problem, a hardware problem, a download, an appointment, an alarm, a modal window, a network status, or an electronic update.

13. The method of claim 1, wherein the at least one visual effect includes a glow effect, a sparkle effect, a ripple effect, a rain effect, a transparency effect, a shadow effect, a darken effect, a frost effect, a de-saturate effect, an animated image effect, or a color change effect.

14. A system for event-based rendering of visual effects, comprising:
    a plug-in architecture that includes a plurality of visual effects plug-ins, wherein the plug-in architecture includes a configuration module that associates the plurality of visual effects plug-ins with a plurality of events;
    one or more display devices that display one or more workspaces associated with a desktop environment, wherein the desktop environment further includes one or more additional workspaces that are neither displayed nor located on the one or more display devices; and
    a detection module that detects at least one of the plurality of events in the one or more additional workspaces associated with the desktop environment that are neither displayed nor located on the one or more display devices, wherein the plug-in architecture renders a visual effect associated with at least one of the plurality of visual effects plug-ins on display device to visually indicate that the detected event occurred in the one or more additional workspaces associated with the desktop environment that are neither displayed nor located on the one or more display devices.

15. The system of claim 14, wherein the detected event relates to an incoming message, a software problem, a hardware problem, a download, an appointment, an alarm, a modal window, a network status, or an electronic update.

16. The system of claim 14, wherein the rendered visual effect includes a glow effect, a sparkle effect, a ripple effect, a rain effect, a transparency effect, a shadow effect, a darken effect, a frost effect, a de-saturate effect, an animated image effect, or a color change effect.

17. The system of claim 14, wherein the rendered visual effect directionally or spatially identifies a location in the one or more additional workspaces in which the detected event occurred relative to the one or more workspaces associated with the desktop environment displayed on the one or more display devices.

18. The system of claim 14, wherein the desktop environment organizes the one or more workspaces displayed on the one or more display devices and the one or more additional workspaces in a multi-dimensional spatial context.

19. The system of claim 18, wherein the multi-dimensional spatial context includes the one or more workspaces displayed on the one or more display devices and the one or more additional workspaces organized in a three-dimensional format.

20. The system of claim 14, wherein the desktop environment operates on one or more processors configured to navigate to the detected event in response to an interaction with the rendered visual effect.

21. The system of claim 20, wherein the plug-in architecture generates a visually perceptible confirmation effect or an audibly perceptible confirmation effect in response to the interaction with the rendered visual effect.

22. The system of claim 20, wherein the plug-in architecture renders a return visual effect to visually identify the one or more workspaces associated with the desktop environment that were displayed on the one or more display devices prior to navigating to the detected event.

23. The system of claim 14, wherein the desktop environment operates on one or more processors configured to:
    navigate to the detected event in response to a mouse-over interaction with the rendered visual effect; and
    navigate back to the one or more workspaces associated with the desktop environment that were displayed on the one or more display devices prior to navigating to the detected event in response to a mouse-off the rendered visual effect.

24. The system of claim 14, wherein the at least one event includes more than one of the plurality of events and the rendered visual effect includes more than one visual effect rendered in a configuration that enables a user of the desktop environment to navigate among the more than one of the plurality of events.

25. The system of claim 24, wherein the rendered configuration further identifies relative severities of the more than one of the plurality of events and relative orders in which the more than one of the plurality of events occurred.

26. The system of claim 14, wherein the plug-in architecture further renders a second visual effect to indicate a severity of the detected event.

27. The method of claim 3, wherein the multi-dimensional spatial context includes the one or more workspaces displayed on the one or more display devices and the one or more additional workspaces organized in a three-dimensional format.

28. A method for event-based rendering of visual effects, comprising:
    displaying, on one or more display devices, a first portion of one or more workspaces associated with a desktop environment;
    detecting at least one event in a second portion of the one or more workspaces or one or more additional workspaces associated with the desktop environment that are neither displayed nor located on the one or more display devices; and
    rendering at least one visual effect to visually indicate that the detected event occurred in the second portion of the one or more workspaces or the one or more additional workspaces associated with the desktop environment that are neither displayed nor located on the one or more display devices.

29. The method of claim 28, wherein the first portion of the one or more workspaces displayed on the one or more display devices is a zoomed-in view associated with the one or more workspaces.

\* \* \* \* \*